(12) United States Patent
Ennis et al.

(10) Patent No.: US 6,795,996 B2
(45) Date of Patent: Sep. 28, 2004

(54) VEHICLE CLEANING ELEMENT

(76) Inventors: G. Thomas Ennis, 235 W. Florence Ave., Inglewood, CA (US) 90301; Francis D. Tenggardjaja, 235 W. Florence Ave., Inglewood, CA (US) 90301

(*) Notice: Subject to any disclaimer, the term of this patent is extended or adjusted under 35 U.S.C. 154(b) by 271 days.

(21) Appl. No.: 10/098,527

(22) Filed: Mar. 18, 2002

(65) Prior Publication Data

US 2003/0172479 A1 Sep. 18, 2003

(51) Int. Cl.[7] .................................................. B60S 3/06
(52) U.S. Cl. ..................................... 15/97.3; 15/230.16
(58) Field of Search .................... 15/97.3, 230, 230.13, 15/230.14, 230.16, 230.17, 230.18, 230.19

(56) References Cited

U.S. PATENT DOCUMENTS

| | | | | |
|---|---|---|---|---|
| 1,118,153 A | * | 11/1914 | Sanborn ................ | 15/230.16 |
| 1,559,080 A | * | 10/1925 | Fields .................... | 15/230.16 |
| 1,685,406 A | * | 9/1928 | Kimman ................ | 15/230.16 |
| 4,603,447 A | * | 8/1986 | Beer ...................... | 15/97.3 |
| 5,077,859 A | | 1/1992 | Ennis .................... | 15/230 |
| 5,463,788 A | | 11/1995 | Ennis .................... | 15/97.3 |
| 5,946,761 A | | 9/1999 | Ennis .................... | 15/230.16 |
| 6,289,544 B1 | * | 9/2001 | Kirikian ................ | 15/97.3 |

* cited by examiner

Primary Examiner—Mark Spisich
(74) Attorney, Agent, or Firm—Mattingly, Stanger & Malur, P.C.

(57) ABSTRACT

A vehicle washing apparatus includes a movable support such as a rotary brush hub having a cleaning element attached thereto. The cleaning element includes a base component having a plurality of spaced slots formed there in and a plurality of cleaning strips extending through the slots to attach the strips to the base component. The slots are formed in a plurality of first and second alternating pairs of slots, with the first pairs of slots being positioned closer to a first edge and the second pairs of slots being positioned closer to an opposite edge of the base component so that when the cleaning strips are inserted through the slots they are mounted in overlapping relationship. A method is also provided for manufacturing the cleaning element.

9 Claims, 10 Drawing Sheets

VEHICLE CLEANING ELEMENT

BACKGROUND OF THE INVENTION

1. Field of the Invention

The present invention relates to an improved vehicle cleaning element and, more particularly, to a cleaning element having a plurality of cleaning strips inserted through slots in a belt-like base component.

2. Description of the Related Art

Many different kinds of devices are known in the art for washing vehicles by employing rotating brush assemblies or other cleaning elements.

In the field of mechanized vehicle washing, the devices employed are generally of two types. The first is a stationary type often referred to as a tunnel wash, whereby the various components are mounted on stationary frame means and the vehicle to be washed is moved through the device either by conveyor means or by driving the car therethrough along a predetermined path. The second is a rollover type wherein the components of the device are mounted on a frame which in turn is mounted on wheels for movement along a predetermined path wherein the rollover device is moved forwardly and backwardly over a vehicle to wash the vehicle.

Illustrated in FIGS. 6–13 are various cleaning elements employed in connection with known prior art rotating brush assemblies used in connection with devices for washing vehicles.

Figure 6:
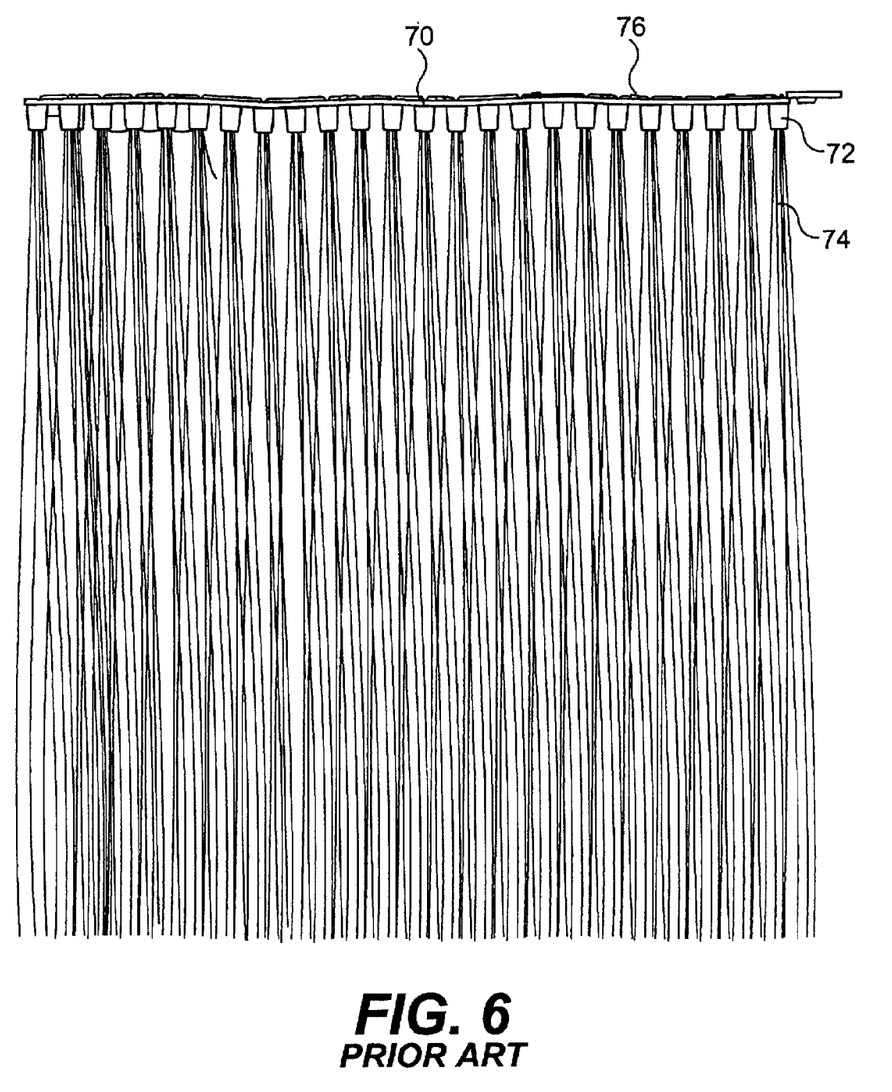
FIG. 6 is a front elevational view of the portion of a prior art cleaning element employing a brush constructed of filaments mounted in cups on a base component.
Figure 7:
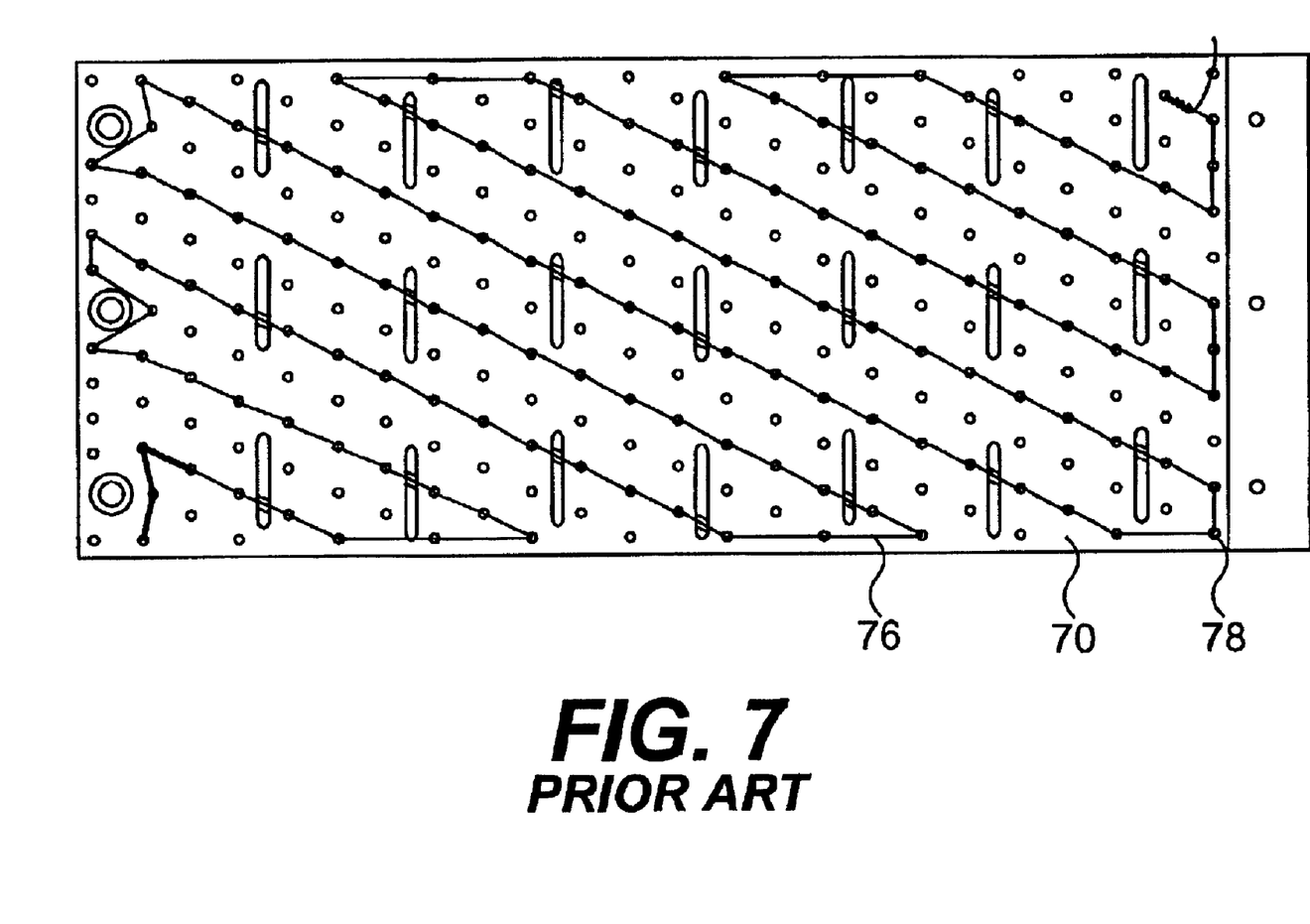
FIG. 7 is a back view of the base component of the cleaning element of FIG. 6.

Shown in FIGS. 6 and 7 is a cleaning element having a belt-like base component 70 with a plurality of spaced cups 72 extending from one surface thereof. Inserted into each cup are a plurality of folded over filaments 74 secured therein by a thread 76 which is inserted through a hole 78 in the bottom of each cup and around the folded portion of the filaments and then back out of the hole 78 on the bottom surface of the base component 70.

FIGS. 8–13 illustrate other forms of known cleaning elements for rotating brush assemblies. Like numerals are used for like elements in each of FIGS. 8–13 described hereafter.

Figure 8:
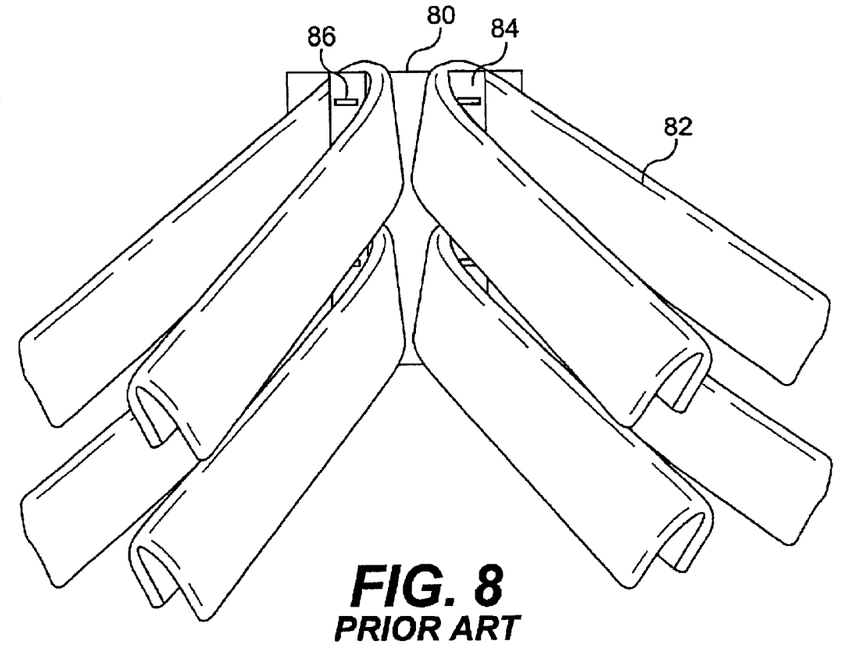
FIG. 8 is an isometric view of a prior art cleaning element illustrating the manner in which cleaning strips are attached to a base component by staples.
Figure 9:
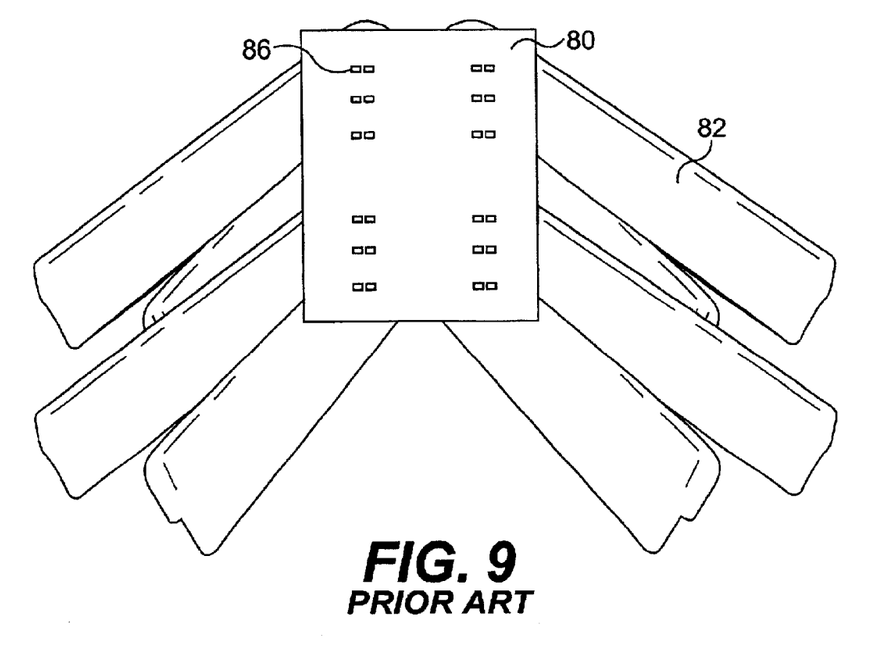
FIG. 9 is a back view of the cleaning element of FIG. 8.

The cleaning element for a rotating brush shown in FIGS. 8 and 9 has a base component 80 having a plurality of folded cleaning strips 82 attached thereto by means of staples 86 extending through a fastening strip 84, the cleaning strips 82 and a base component 80. As shown in FIG. 9, the staples are crimped at the ends thereof on the backside of the base component.

Figure 10:
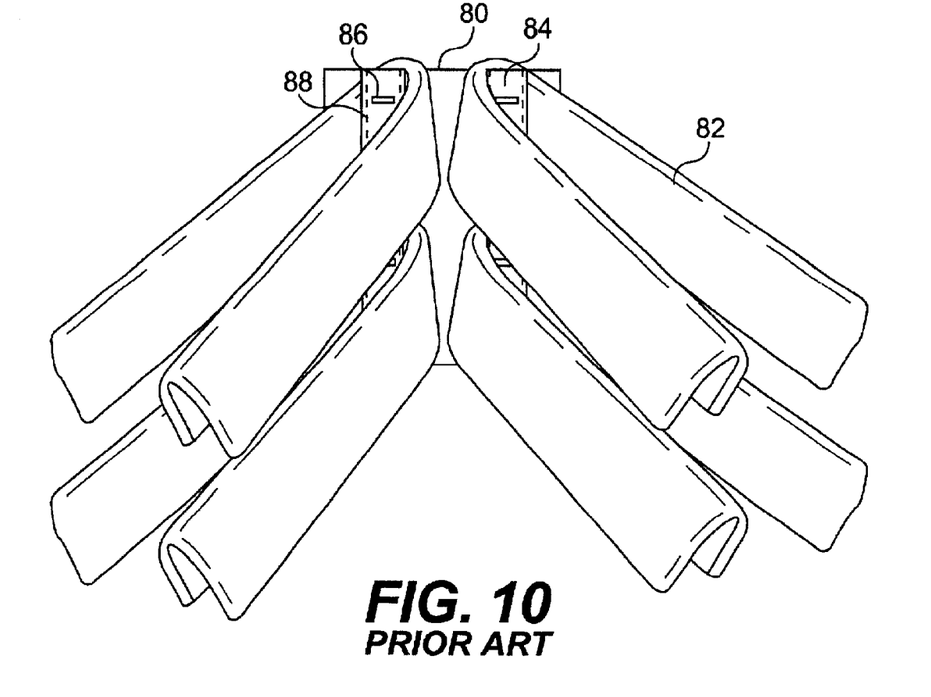
FIG. 10 is an isometric view of another prior art cleaning element showing the manner in which cleaning strips are attached to a base component by a combination of staples and stitching.
Figure 11:
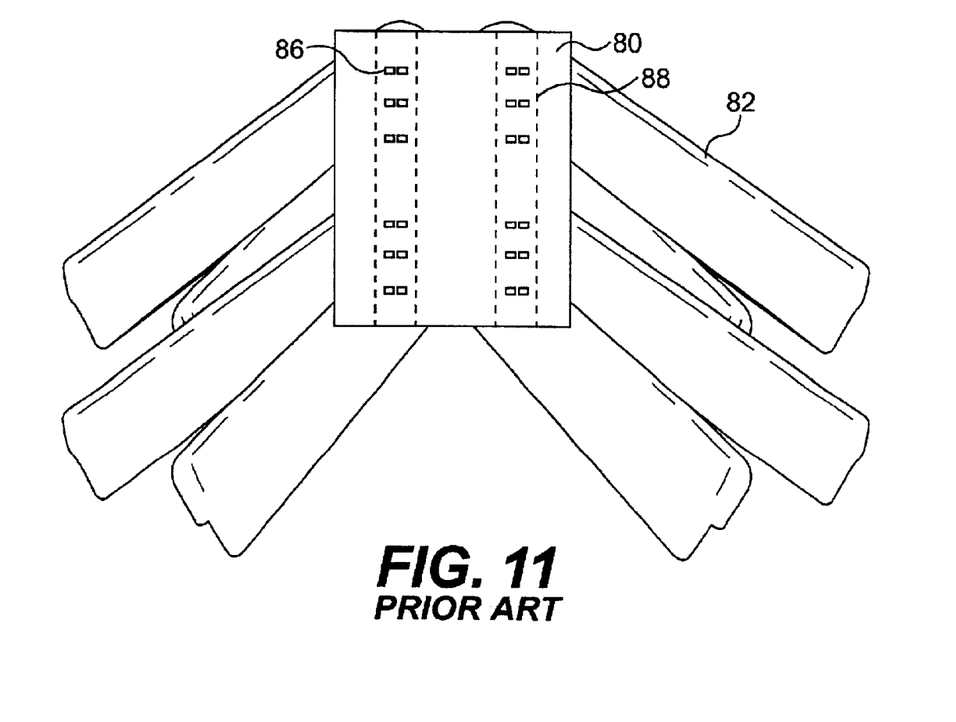
FIG. 11 is a view showing the back of the cleaning element of FIG. 10.

Shown in FIGS. 10 and 11 is a cleaning element having a base component 80 to which are attached cleaning strips 82 by means of staples 86 extending through fastening strips 84, the cleaning strip 82 and a base component 80, with the staples being cramped on the back side of the base component as shown in FIG. 11. The cleaning strips are further attached to the base component 80 by means of threads 88 stitched through the fastening strip 84, the cleaning element 82 and the base component 80.

Figure 12:
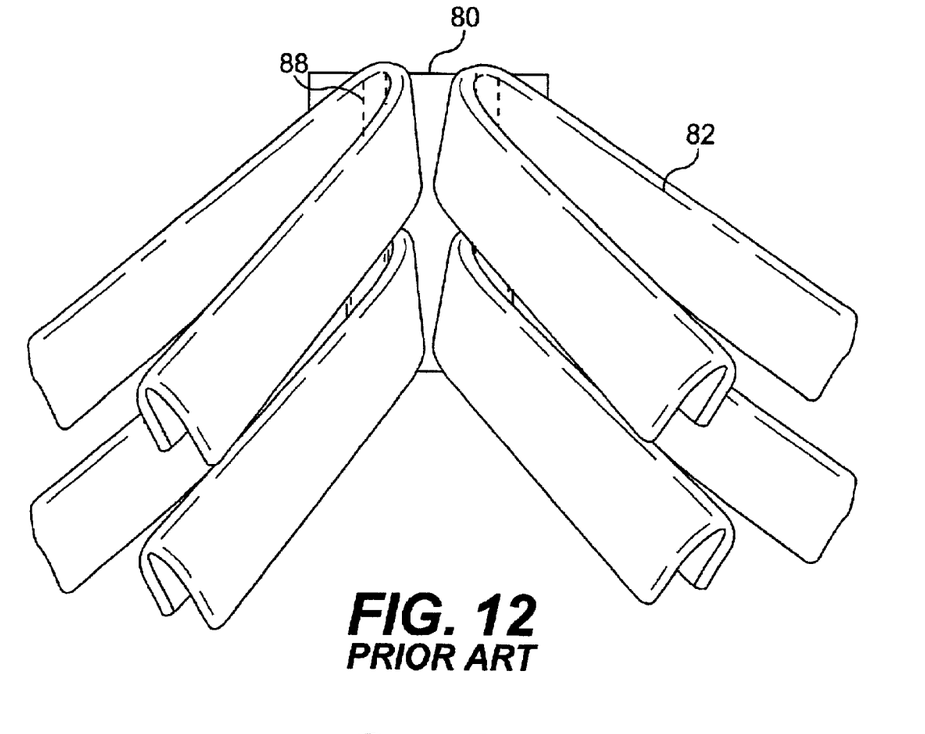
FIG. 12 is an isometric view of another prior art cleaning element showing cleaning strips attached to a base component by stitching.
Figure 13:
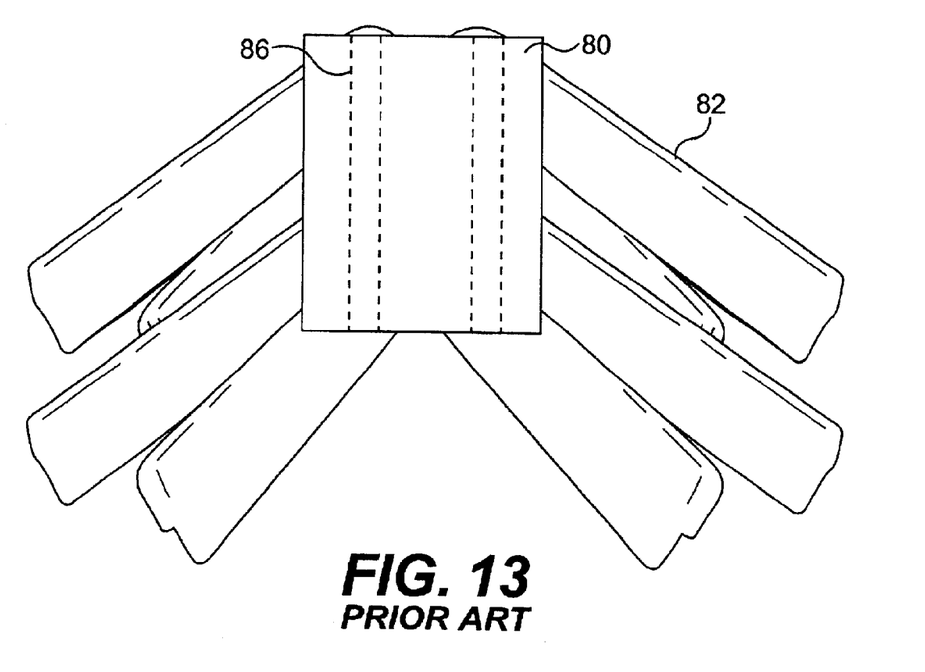
FIG. 13 is a view showing the back of the cleaning element of FIG. 12.

Shown in FIGS. 12 and 13 is a cleaning element formed by attaching cleaning strips 82 to a base component 80 by threads 88 stitched through the cleaning strips 82 and the base component 80.

In the prior art cleaning elements for rotating brush assemblies such as those described above, all of these elements require mechanical ways of positively attaching a cleaning strip to a base component such as by using staples, threads, hand tying and the like.

Such methods as those described above are labor intensive and therefore relatively time consuming and expensive to construct. Such devices are also more difficult to repair since any new cleaning strips must be attached by some positive mechanical attaching means. Accordingly, there has long existed a need in the art for a cleaning element which is of simple construction and easy to manufacture.

SUMMARY OF THE INVENTION

It is an object of the present invention to provide a cleaning element for a vehicle washing apparatus which avoids the disadvantages of the prior art discussed above by providing a cleaning element attached to a movable support wherein the cleaning element includes a base component having a plurality of cleaning strips attached thereto by being inserted through slots in the base component.

A further object of the invention is to provide a cleaning element for use in a rotating brush assembly of a vehicle washing apparatus wherein cleaning strips may be easily attached to a base component by insertion through adjacent slots in a base component whereby two cleaning strips are in overlapping relation so that they are tightly gripped through friction in the slots of the base component and also eliminate gaps between cleaning strips.

Another object of the invention is to provide a cleaning element for a rotating brush assembly for a vehicle washing apparatus wherein cleaning strips can easily be inserted and pulled out of slots in a base component and therefore are easy to replace and repair.

A still further object of the invention is to provide a method of manufacturing a cleaning element for a rotary brush assembly of a vehicle washing apparatus which is simple in construction and economical to manufacture.

The present invention achieves the above and other objects by providing a vehicle washing apparatus which includes a cleaning element having a plurality of cleaning strips attached to a base component by being inserted through a plurality of spaced slots in the base component with adjacent cleaning strips being mounted in overlapping relationship. The slots in the base component are formed in a plurality of first and second alternating pairs of slots, with the first pairs of slots being positioned closer to a first edge of the base component and the second pairs of slots being positioned closer to an opposite edge of the base component.

The present invention further includes a method of manufacturing a cleaning element for a vehicle washing apparatus which includes the steps of forming a base component, forming a plurality of slots in the base component so that the slots are formed in a plurality of first and second alternating pairs of slots with the first pairs of slots being positioned closer to a first edge of the base component and second pairs of slots being positioned closer to an opposite edge of the base component and inserting cleaning strips through the slots whereby adjacent cleaning strips are in overlapping relation.

These and other features and advantages of the present invention will become more apparent with reference to the following detailed description of drawings.

DETAILED DESCRIPTION OF THE PREFERRED EMBODIMENTS

Figure 1:
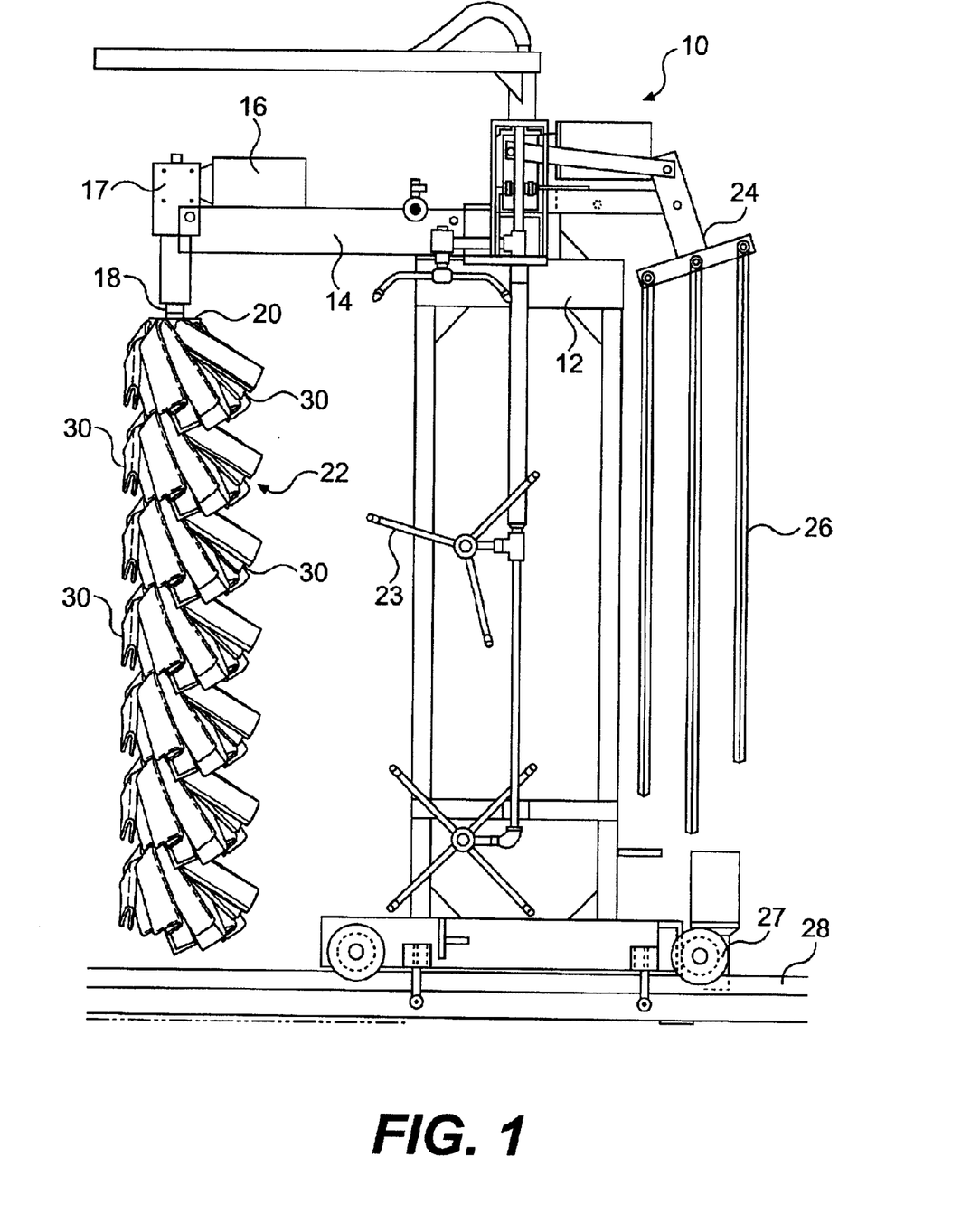
FIG. 1 is a side elevational view of a vehicle washing apparatus employing a rotary brush having cleaning elements constructed according to the present invention.
Figure 2:
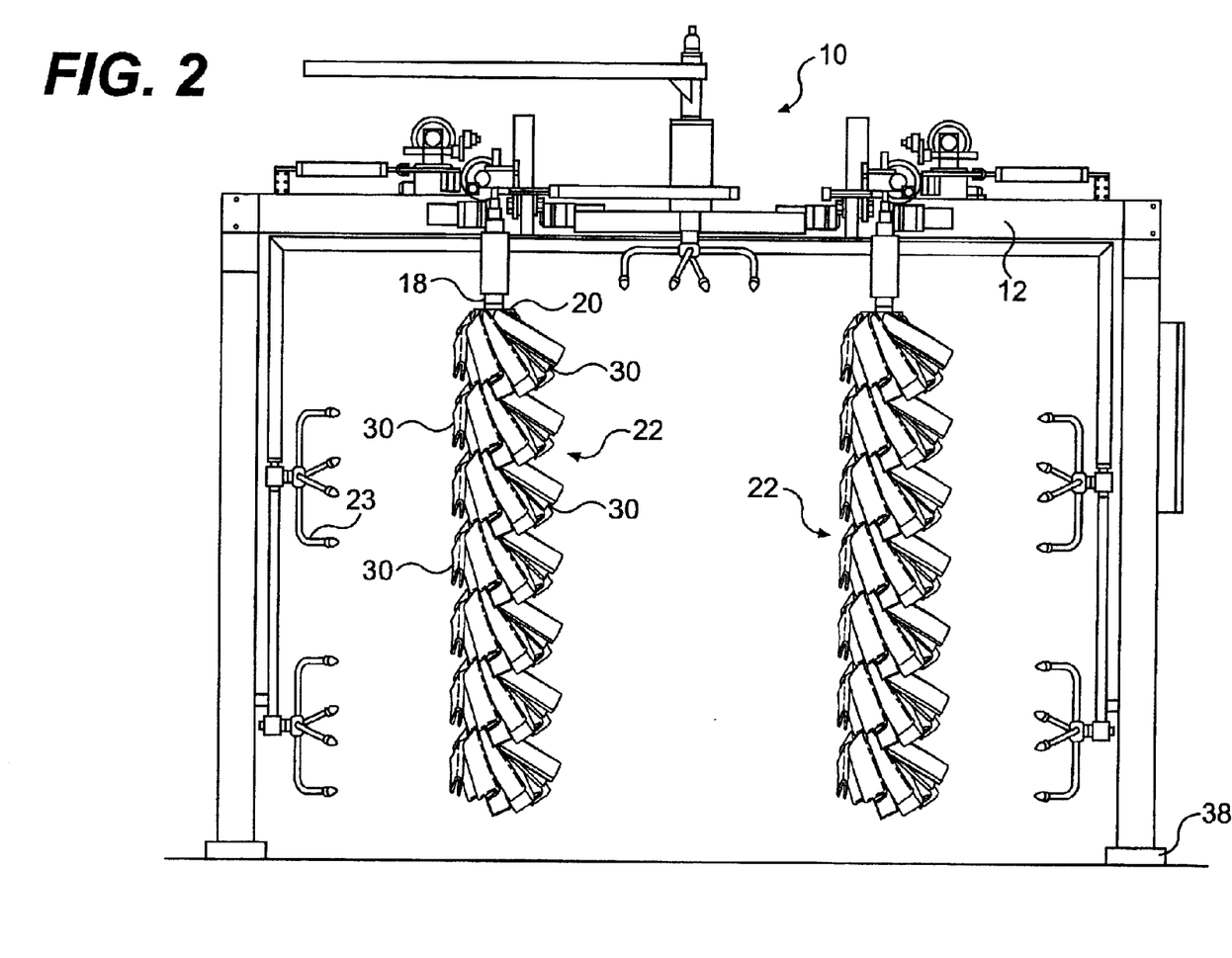
FIG. 2 is a front elevational view of a vehicle washing apparatus employing a pair of rotary brushes having cleaning elements constructed according to the present invention.

Referring now to FIGS. 1 and 2 of the drawings, a vehicle washing apparatus generally referred to by numeral 10, includes a supporting frame 12 having a swing arm 14 pivotally attached thereto. A rotary brush assembly, generally indicated by the numeral 22, is rotatably attached to the outer end of the swing arm 14.

The rotary brush assembly includes a drive shaft 18, having a hub 20 attached thereto. A plurality of stacked cleaning elements 30 are attached to the hub to form a rotary brush which functions as a side brush to clean the sides of a vehicle. A motor 16, mounted at the outer end of the swing arm 14, is connected to the rotary brush assembly through a gear box 17 to rotate the brush. A plurality of spray nozzles 23 are attached to the supporting frame 12 to spray liquid on a vehicle being washed.

In the embodiment shown in FIG. 1, a movable scrubber curtain assembly comprised of a frame 24 having a plurality of scrubber curtains 26 suspended therefrom is provided on the end of the vehicle washing apparatus opposite to the end on which the rotary brush assembly 22 is mounted. The scrubber curtain assembly may be of the type disclosed in U.S. Pat. No. 5,463,788, which is incorporated herein by reference.

The vehicle washing apparatus shown in FIG. 1 is of the rollover type and has a plurality of wheels 27 at the bottom thereof to move the apparatus along a track 28.

A modified form of the vehicle washing apparatus 22 is shown FIG. 2, which is of the tunnel type having a stationary frame 12 supported on a surface by fixed mounting plates 38. The apparatus of FIG. 2 includes a pair of rotary brush assemblies 22.

As shown in FIGS. 3, 3A, 4 and 5, each cleaning element 30 is comprised of a base component 32 in the form of a belt having a plurality of spaced slots 26 therein through which a plurality of cleaning strips 34 are inserted. The base component 32 preferably is constructed from a flexible plastic material such as a high density polyethylene but also may be constructed of other suitable material such as a thin metal. The cleaning strips 34 preferably are of a deep pile, tufted (randomly oriented) monofilament fibrous material manufactured by Borg Fabrics of NY. The fabric is of a deep pile material which has a fur-like appearance.

The deep pile, fur-like material preferably has a thickness or depth of from one-fourth of an inch to one inch. The fibers of the material are 85% polyester and 15% acrylic. A small section of this material is illustrated in FIG. 3A as a thick cluster of tufted monofilament fibers 40 upstanding from a woven base 42 which provides a fabric layer. The base 42 is made of 100% polyester or other comparable materials. The woven base provides an elastic base or backing. A non-elastic backing 44 also may be applied to the base if desired. The backing 44 may be attached by stitching or by adhesive bonding or other suitable means to the base 42.

The cleaning strips also may be constructed of other suitable materials such as regular cloth, felt or the like.

In constructing the base component 32, the material is cut into an elongated belt like form and slots 26 are formed therein by any suitable means such as cutting or punching. As most clearly shown in FIG. 4, the slots are formed in a plurality of first and second alternating pairs of slots, with the first pairs of slots 50A and 50B being positioned closer to a first edge 52 of the base component and the second pairs of slots 54A and 54B being positioned closer to an opposite edge 56 of the base component.

Figure 3:
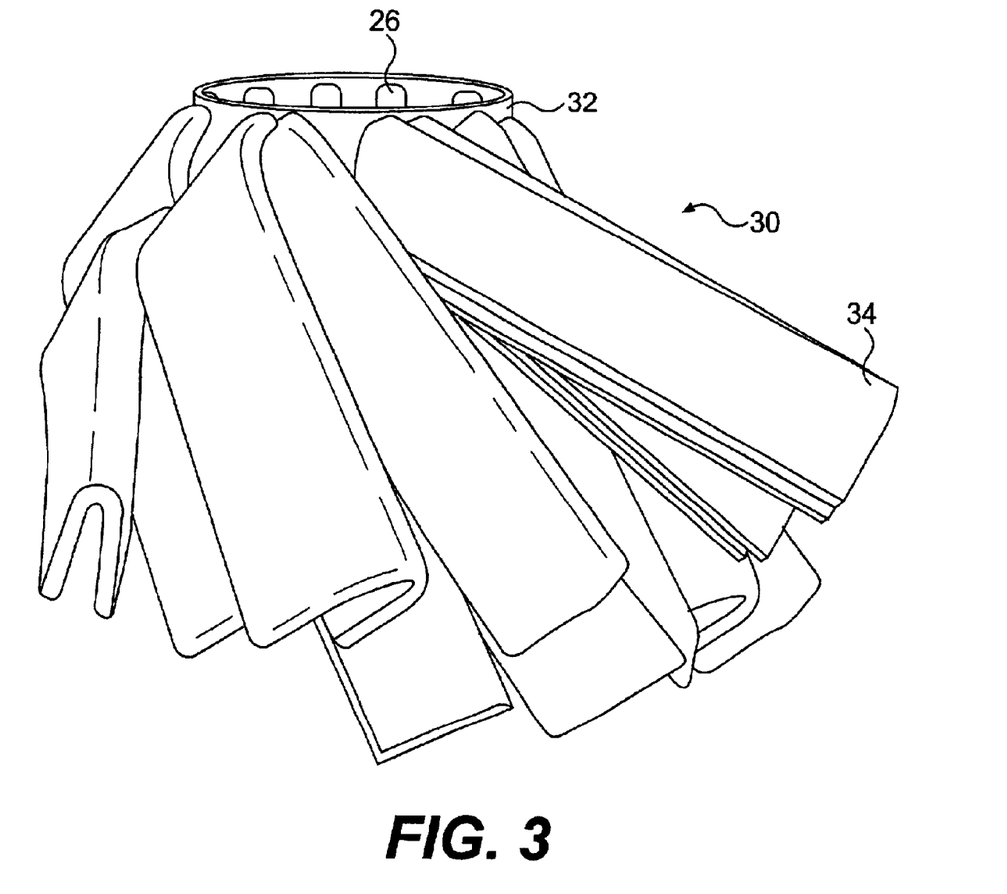
FIG. 3 is an isometric view of a single cleaning element according to the present invention.
Figure 3A:
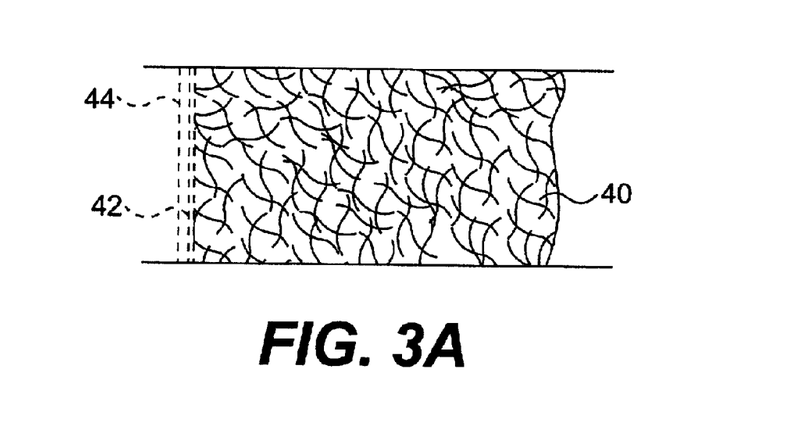
FIG. 3A is an enlarged side elevational view of a piece of material used in making the cleaning strips of the present invention.
Figure 4:
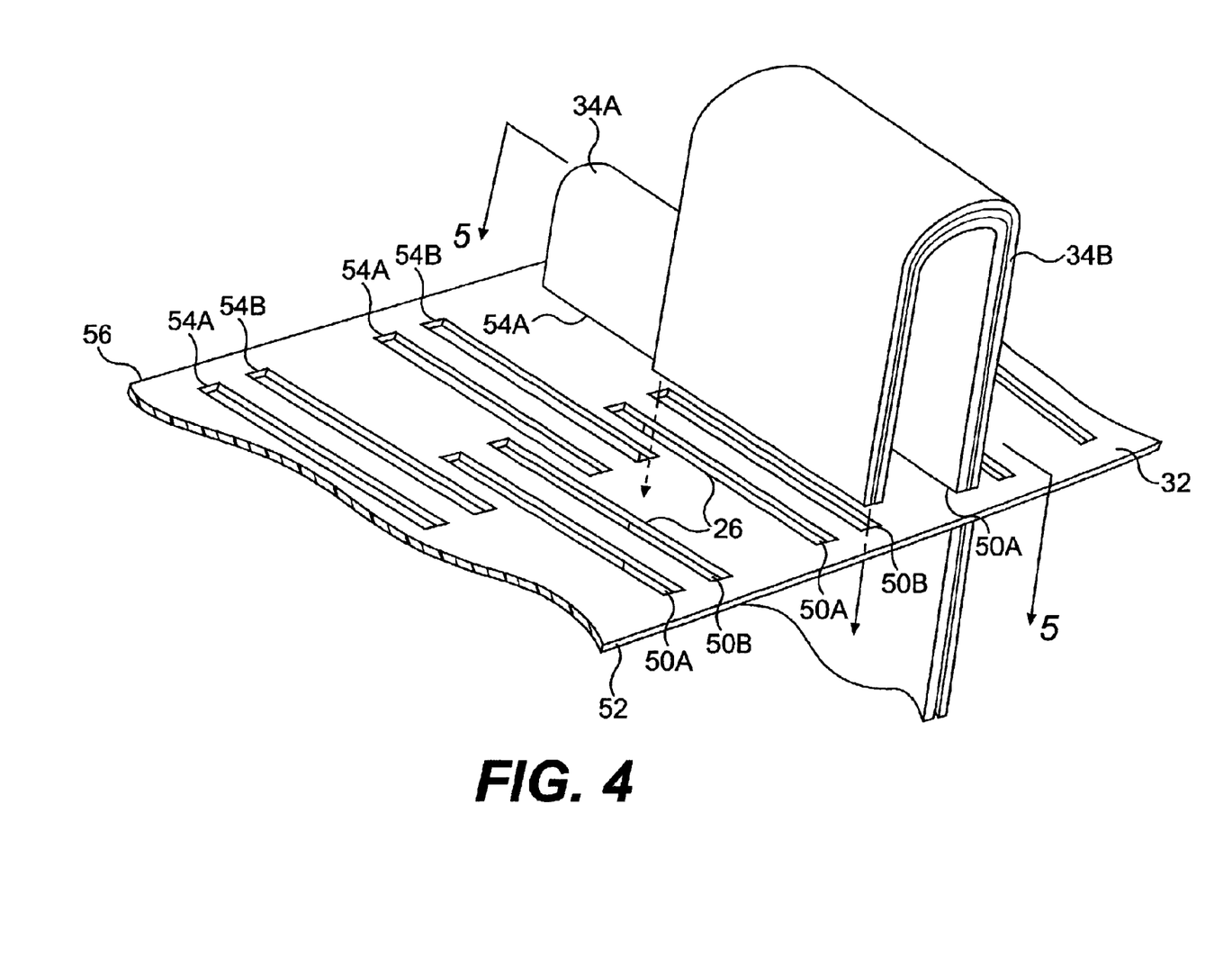
FIG. 4 is an isometric view showing the manner in which two adjacent cleaning strips are inserted through slots in a base component to mount the cleaning strips thereon.
Figure 5:
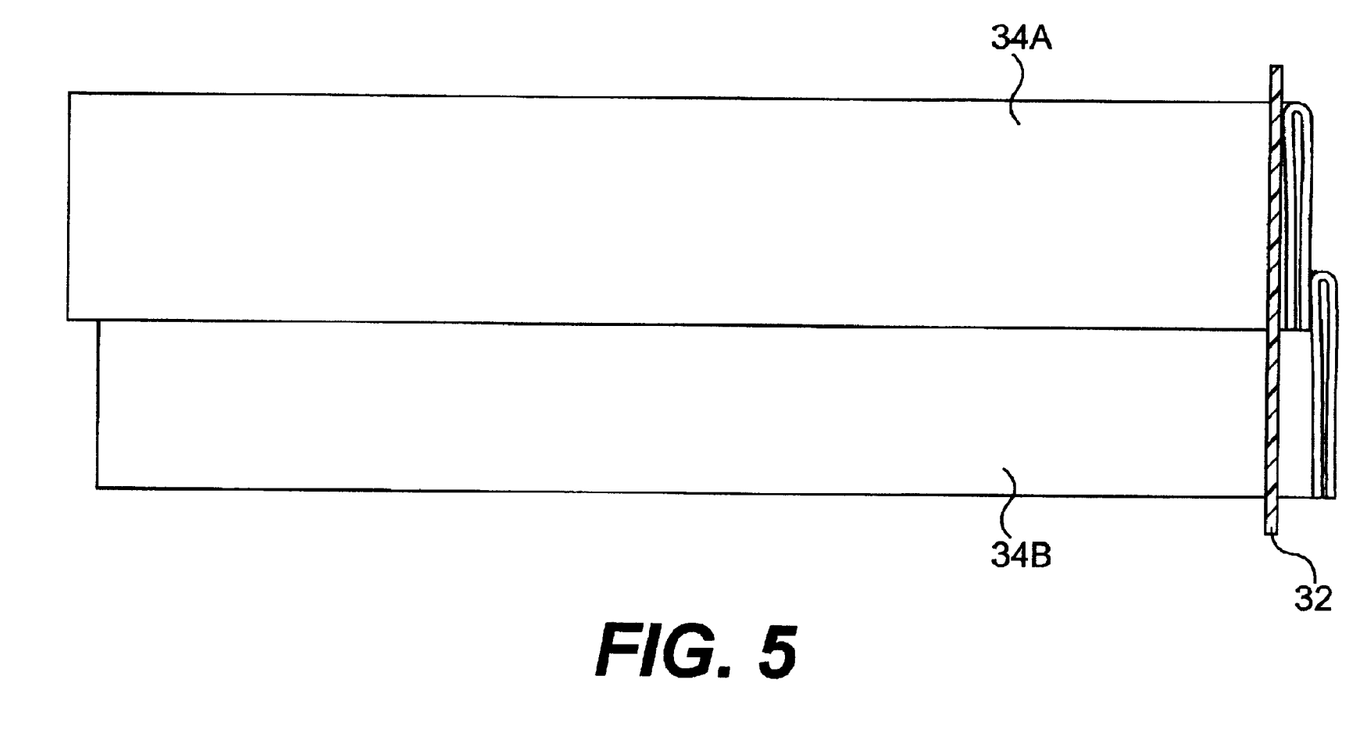
FIG. 5 is a sectional view taken along line 5—5 of FIG. 4 showing two cleaning strips fully inserted in overlapping relationship in a base component.

As shown in FIGS. 3, 4 and 5 each cleaning strip 34 is formed by making a flat strip of the deep pile, fur-like material and folding the backing side of the material over on itself whereby the deep pile, fur-like material is all on the outside of the cleaning strip and the backing material 42 is all on the inside of each strip.

In assembling each cleaning element, a first cleaning strip 34A folded over upon itself is inserted into a slot 54A from the front side and pulled through the slot and then is bent over and inserted through a slot 54B from the back side to the front side and then is pulled tight so that the fold of the cleaning strip is snug with the base component 32 as shown in FIG. 5. A second cleaning strip 34B folded over upon itself is inserted from the front of the base component 32 through a slot 50A of a first pair of slots closer to edge 52 and then is bent over and inserted from the back side of the base component 32 to the front side thereof through a slot 50B of an adjacent pair of first slots closer to the edge 52. The second cleaning strip 34B is then pulled through until it is snug with the first cleaning strip 34A as shown in FIG. 5.

The cleaning strips 34 are held in these slots through friction between the deep pile fur-like material sides of these strips and the edges and sides of the slots. Moreover, by pulling two strips 34A and 34B into snug overlapping relationship whereby a cleaning strip 34B overlaps and end of a cleaning strip 34A, the grip of the slots on the strips is tightened. The overlapping of the cleaning strips also eliminates gaps between the cleaning strips to provide a more efficient washing construction of the cleaning element 30.

As shown in FIGS. 1 and 2, a plurality of the cleaning elements 30 may be mounted in stacked relationship on a hub 20 to form a brush of a desired height. When each cleaning element 30 is mounted on a hub 20, the base component 32 is wrapped around the hub to form an endless belt as shown in FIG. 3.

The cleaning elements of the invention also may be used in connection with other movable supports then the rotary brush assemblies. For example, the scrubber curtains 26 shown in FIG. 1 may be constructed of the same base component 32 having cleaning strips 34 inserted through slots therein. The cleaning elements also may be used in connection with rocker panel brushes and other types of brushes and scrubbers.

Applicants' invention provides several advantages over the prior art cleaning elements and methods of manufacturing thereof. By simply inserting the cleaning strips through slots in the base component, the cleaning strips are easily attached without requiring separate mechanical fastening means such as staples and threads. This construction also makes it much easier to replace individual cleaning strips since it is only necessary to pull a worn or otherwise defective strip through the slots to remove it and then simply replace the strip by a new cleaning strip by inserting it through the slots. Moreover, by arranging the strips in overlapping relationship, the cleaning strips are gripped more tightly in the slots and have greater resistance to being pulled out.

Numerous other modifications and adaptations of the present invention will be apparent to those skilled in the art and thus, it is intended by the following claims to cover all such modifications and adaptations which fall within the true spirit and scope of the invention.

What is claimed is:

1. A vehicle washing apparatus comprising:
    a movable support;
    a cleaning element attached to said movable support;
    said cleaning element comprising;
        a base component having a plurality of spaced slots formed therein; and
        a plurality of cleaning strips extending through said slots to attach said strips to said base component; and
        wherein said base component has a front side and a back side and each of said cleaning strips extends through one of said slots in a direction from the front side to the back side and extends through an adjacent slot in an opposite direction from the back side to the front side to form a pair of outwardly extending legs for each cleaning strip; and
        wherein said slots are elongated and certain of said slots are positioned closer to a first edge of said base component and other of said slots are positioned closer to an opposite second edge of said base component and certain of said cleaning strips extend through a pair of slots closer to said first edge and other of said cleaning strips extend through a pair of slots closer to said opposite second edge.

2. A vehicle washing apparatus according to claim 1 wherein each cleaning strip extending through a pair of slots closer to said first edge is in overlapping relationship to a cleaning strip extending through a pair of slots closer to said opposite second edge.

3. A vehicle washing apparatus according to claim 1 wherein said movable support comprises a side brush.

4. A vehicle washing apparatus according to claim 1 wherein said movable support comprises a rocker panel brush.

5. A vehicle washing apparatus according to claim 1 wherein said movable support comprises a top scrubber curtain.

6. A vehicle washing apparatus comprising:
    a movable support; and
    a cleaning element attached to said movable support;
    said cleaning element comprising;
        a base component having a plurality of spaced slots formed therein; and
        a plurality of cleaning strips extending through said slots to attach said strips to said base component; and
        wherein said slots are formed in a plurality of first and second alternating pairs of slots, with said first pairs of slots being positioned closer to a first edge of said base component and said second pairs of slots being positioned closer to an opposite edge of said base component.

7. A rotatable brush assembly for a vehicle washing apparatus, said brush assembly comprising:
    a hub;
    a plurality of cleaning elements mounted on said hub in stacked relationship;
    each said cleaning element comprising;
        a base component having a plurality of spaced slots formed therein; and
        a plurality of cleaning strips extending through said slots to attach said strips to said base component; and
        wherein said base component has a front side and a back side and each of said cleaning strips extends through one of said slots in a direction from the front side to the back side and extends through an adjacent slot in an opposite direction from the back side to the front side to form a pair of outwardly extending legs for each cleaning strip; and
        wherein said slots are elongated and certain of said slots are positioned closer to a first edge of said base component and other of said slots are positioned closer to an opposite second edge of said base component and certain of said cleaning strips extend through a pair of slots closer to said first edge and other of said cleaning strips extend through a pair of slots closer to said opposite second edge.

8. A rotatable brush assembly for a vehicle washing apparatus according to claim 7 wherein each cleaning strip extending through a pair of slots closer to said first edge is in overlapping relationship to a cleaning strip extending through a pair of slots closer to said opposite second edge.

9. A rotatable brush assembly for a vehicle washing apparatus, said brush assembly comprising:
    a hub;
    a plurality of cleaning elements mounted on said hub in stacked relationship;
    each said cleaning element comprising;
        a base component having a plurality of spaced slots formed therein; and
        a plurality of cleaning strips extending through said slots to attach said strips to said base component; and
        wherein said slots are formed in a plurality of first and second alternating pairs of slots, with said first pairs of slots being positioned closer to a first edge of said base component and said second pairs of slots being positioned closer to an opposite edge of said base component.

* * * * *